(12) United States Patent  
Tu et al.

(10) Patent No.: US 7,702,372 B2
(45) Date of Patent: Apr. 20, 2010

(54) BATTERY COVER ASSEMBLY FOR PORTABLE ELECTRONIC DEVICE

(75) Inventors: Yong-Bo Tu, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 772 days.

(21) Appl. No.: 11/411,583

(22) Filed: Apr. 26, 2006

(65) Prior Publication Data

US 2007/0015477 A1    Jan. 18, 2007

(30) Foreign Application Priority Data

Jul. 15, 2005 (CN) .................... 2005 1 0036030

(51) Int. Cl.
*H04M 1/00* (2006.01)
(52) U.S. Cl. ................ 455/575.1; 455/575.8; 455/90.3; 455/550.1
(58) Field of Classification Search .............. 455/575.1, 455/575.8, 90.3, 550.1
See application file for complete search history.

(56) References Cited

U.S. PATENT DOCUMENTS

| 5,895,729 | A | * | 4/1999 | Phelps et al. | ................. | 429/97 |
| 5,924,749 | A | * | 7/1999 | Weadon et al. | ................. | 292/80 |
| 6,625,425 | B1 | * | 9/2003 | Hughes et al. | ............. | 455/90.3 |
| 2004/0224220 | A1 | * | 11/2004 | Wang et al. | ................... | 429/96 |
| 2004/0233653 | A1 | * | 11/2004 | Luo et al. | ................... | 361/797 |
| 2005/0084747 | A1 | * | 4/2005 | Allen et al. | ................... | 429/97 |
| 2005/0281006 | A1 | * | 12/2005 | Stone et al. | ................. | 361/747 |

\* cited by examiner

*Primary Examiner*—Joseph H Feild
*Assistant Examiner*—Huy D Nguyen
(74) *Attorney, Agent, or Firm*—Steven M. Reiss

(57) ABSTRACT

A battery cover assembly (100) is for use in a portable electronic device. The battery cover includes a housing (10) and a battery cover (20). The housing has a first engaging portion (13) at one end thereof, and a holding portion (11) at an opposite end. The holding portion has an latch plate (1111). The battery cover has a second engaging portion (214) formed at one end thereof for engaging with the first engaging portion and defines a latch opening therein for engaging with the latch plate. The latch plate is integrated with the housing for being elastically deformed by an outside force so as to releasably lock with battery cover.

2 Claims, 5 Drawing Sheets

BATTERY COVER ASSEMBLY FOR PORTABLE ELECTRONIC DEVICE

BACKGROUND OF THE INVENTION

1. Field of the Invention

The present invention generally relates to battery cover assemblies and, more particularly, to a battery cover assembly for use in a portable electronic device.

2. Discussion of the Related Art

Batteries are widely used in portable electronic devices, such as personal digital assistants (PDAs), mobile phones, and so on. Conventional batteries are attachably received in the electronic device, and battery covers are designed to connect with housings of the electronic devices to package the batteries. The batteries have to be replaced by opening the battery covers when, e.g., the batteries are damaged or dead (i.e. no longer rechargeable).

A clasp structure or latch structure is used with a typical battery cover to engage with a housing of a portable electronic device. For example, a mobile phone has a latch for the battery cover. The latch includes a pair of hooks at one end of the battery cover and a locking pin protruding from the other end of the battery cover. Accordingly, a pair of grooves are defined in an end portion of a backside of a housing of the mobile phone, and a locking hole is defined in the other end portion of the backside of the housing. In assembly, the hooks are firstly inserted into the grooves in the backside of the housing. Then, the battery cover is pressed downwardly onto the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm, too. However, during disassembly, a relatively great effort is needed to disassemble the battery cover, since a substantial force is exerted thereon. Therefore, the battery cover is susceptible to damage during such disassembly. As a result, it is inconvenient for a user to replace a battery in the housing of the mobile phone.

Therefore, a new battery cover assembly is desired in order to overcome the above-described shortcomings.

SUMMARY OF THE INVENTION

In one embodiment thereof, a battery cover assembly, configured for use in a portable electronic device, includes a housing and a battery cover. The housing has a first engaging portion at one end thereof, and a holding portion at an opposite end. The holding portion has an latch plate. The battery cover has a second engaging portion formed at one end thereof for engaging with the first engaging portion and defines a latch opening therein for engaging with the latch plate. The latch plate is integrated with the housing for being elastically deformed by an outside force so as to releasably lock with the battery cover.

Other advantages and novel features will become more apparent from the following detailed description, when taken in conjunction with the accompanying drawings.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the present battery cover assembly. Moreover, in the drawings, like reference numerals designate corresponding parts throughout the several views.

DETAILED DESCRIPTION OF THE EMBODIMENTS

Figure 1:
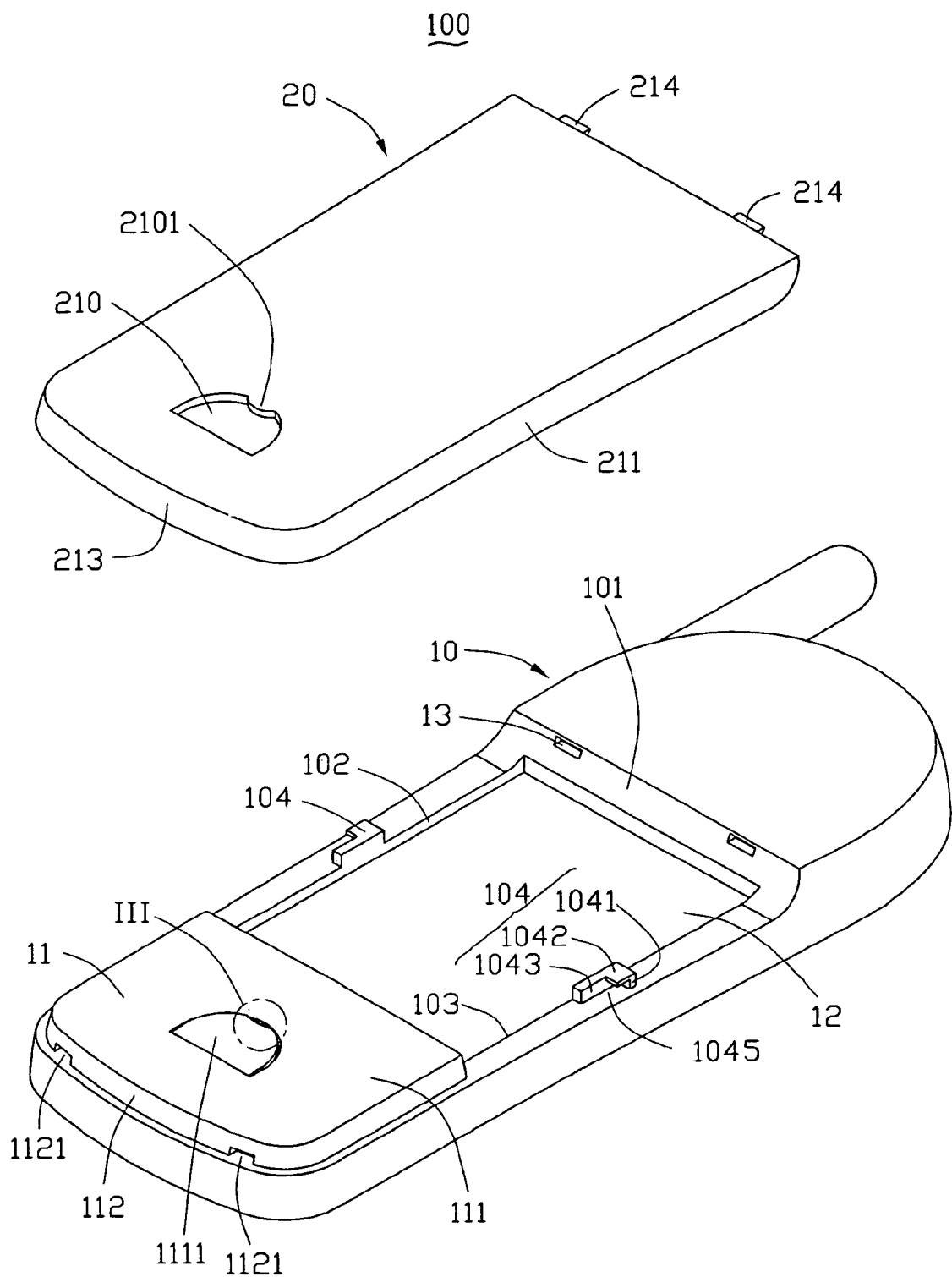
FIG. 1 is an exploded, isometric view of the battery cover assembly for a portable electronic device, in accordance with a preferred embodiment.

Referring now to the drawings in detail, FIG. 1 shows a battery cover assembly 100 for a portable electronic device such as a mobile phone. The battery cover assembly 100 includes a housing 10 and a battery cover 20.

The housing 10 has an end wall 101 at one end thereof two parallel side walls 102, 103 perpendicularly connecting the end wall 101, and a holding portion 11 opposite to the end wall 101. The end wall 101, the two side walls 102, 103 and the holding portion 11 define a substantially rectangular receiving cavity 12 for receiving a battery (not shown). The end wall 101 defines two holding holes 13, each holding hole 13 is rectangular in shape. The side walls 102, 103 each have a latching portion 104. The latching portion 104 includes three walls 1041, 1042, 1043 and three walls 1041, 1042, 1043 perpendicularly connecting to each other so as to define a holding niche 1045 facing the holding portion 11. The holding portion 11 is a protruding stage extending from one end of the housing 10 and is adjacent to one end of the receiving cavity 12. The holding portion 11 has a top surface 111 and an end portion 112. The end portion 112 defines two latching holes 1121 therein.

Figure 3:
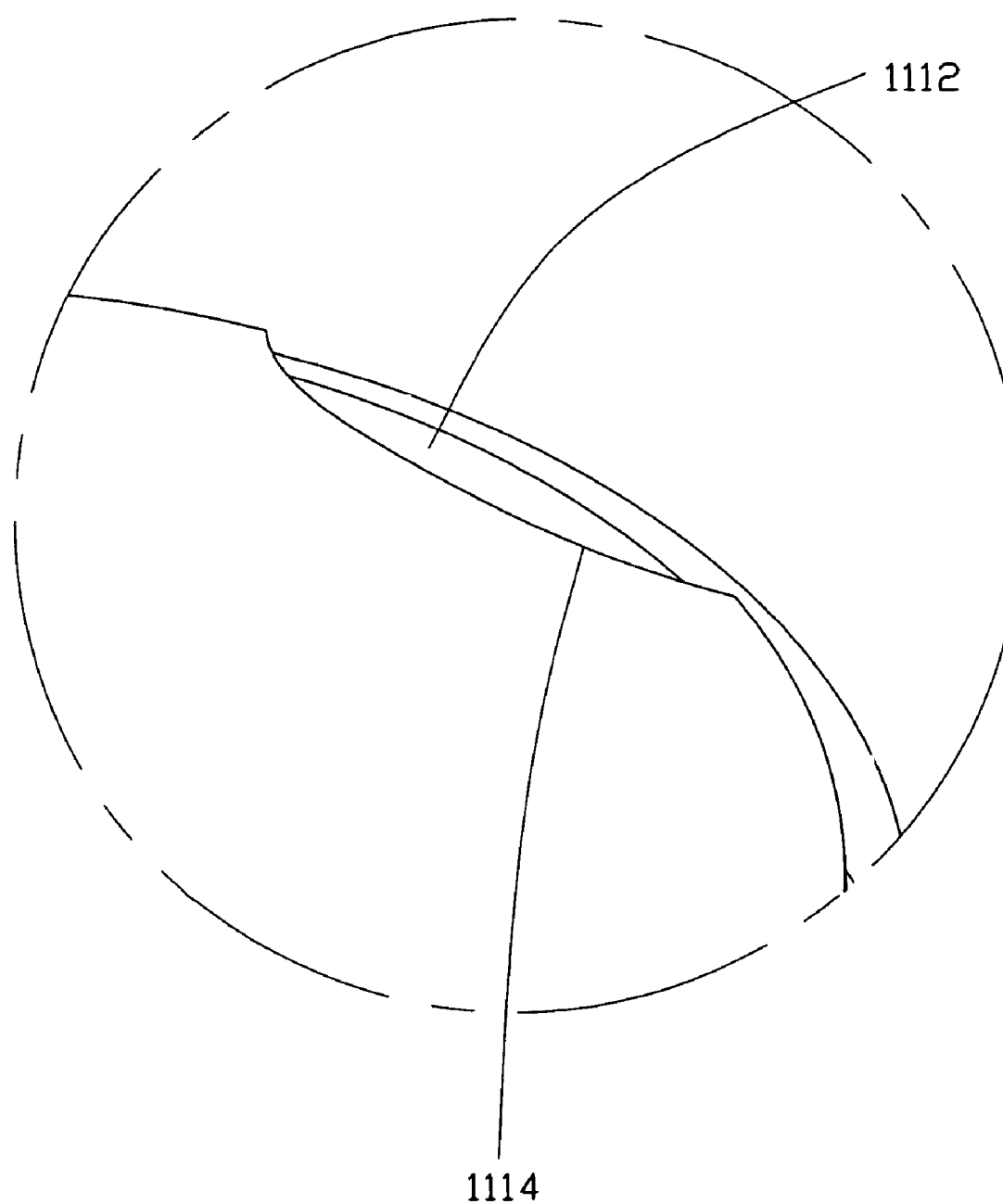
FIG. 3 is an enlarged, isometric view of an latch plate of the battery cover assembly shown in FIG. 1.

An latch plate 1111 extends from the holding portion 11 in the middle of the top surface 111. Referring to FIG. 3, the latch plate 1111 is semi-circular or arcuate in shape and is integrated with the housing 40. The latch plate 1111 has a fixed portion (not labeled) connected to the holding portion 11, and an elastic portion (not labeled) separated from the holding portion 11. The elastic portion is higher than the top surface 111 and has one end connecting to the fixed portion and an opposite end defining a concave portion 1112 therein. The concave portion 1112 is also arc-shaped. A step wall 1114 is configured adjacent to concave portion 1112. When an outside force is put on the elastic portion, the elastic portion can produce elastic deformation so as to rotate relative to the fixed portion, and if the outside force is removed, the elastic portion will automatically rebound to its original position.

Figure 2:
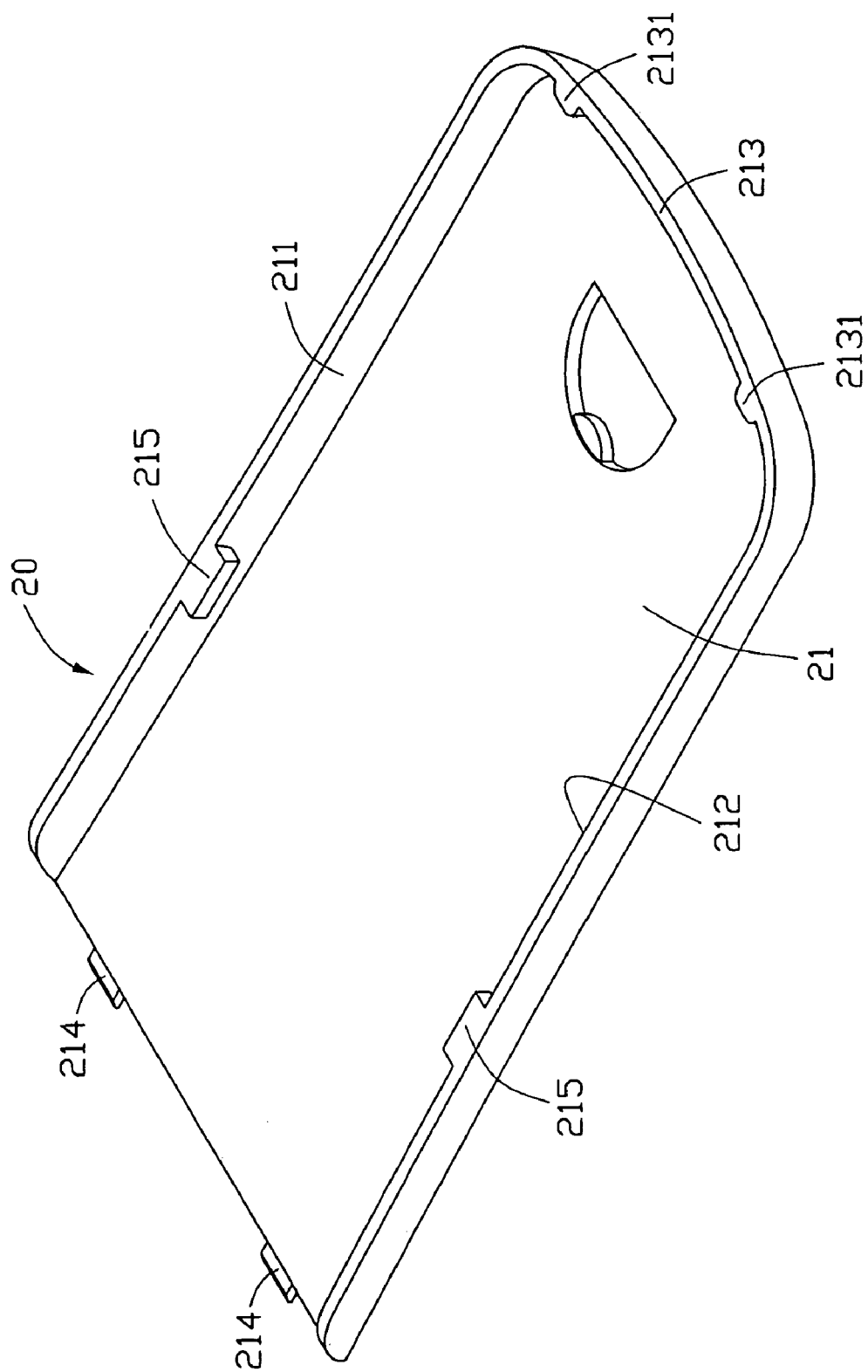
FIG. 2 is an schematic view of a battery cover of the battery cover assembly shown in FIG. 1.

Referring now to FIGS. 2-3, the battery cover 20 includes a main body 21, a first sidewall 211, a second sidewall 212, and a top wall 213. The first sidewall 211 and the second sidewall 212 are parallel to each other and both have an end connecting to the top wall 213. The main body 21 defines a latch opening 210 in one end near the top wall 213. The latch opening 210 has a shape corresponding to the latch plate 1111 of the holding portion 11 for engaging with the latch plate 1111. A protruding portion 2101 extends into the latch opening 210 from the main body 21 for engaging with the concave portion 1112 of the latch plate 1111. The main body 21 has one end connecting to the top wall 213 and an opposite end forming two holding blocks 214. The two holding blocks 214 have a shape corresponding to the two holding holes 13 of the housing 10. The first sidewall 211 and the second sidewall 212 each have a latching block 215 formed in the middle thereof for engaging with the holding niches 1045 of the latching portion 104. The top wall 213 has two catching blocks 2131 for engaging with the latching holes 1121 of the housing 10.

Figure 4:
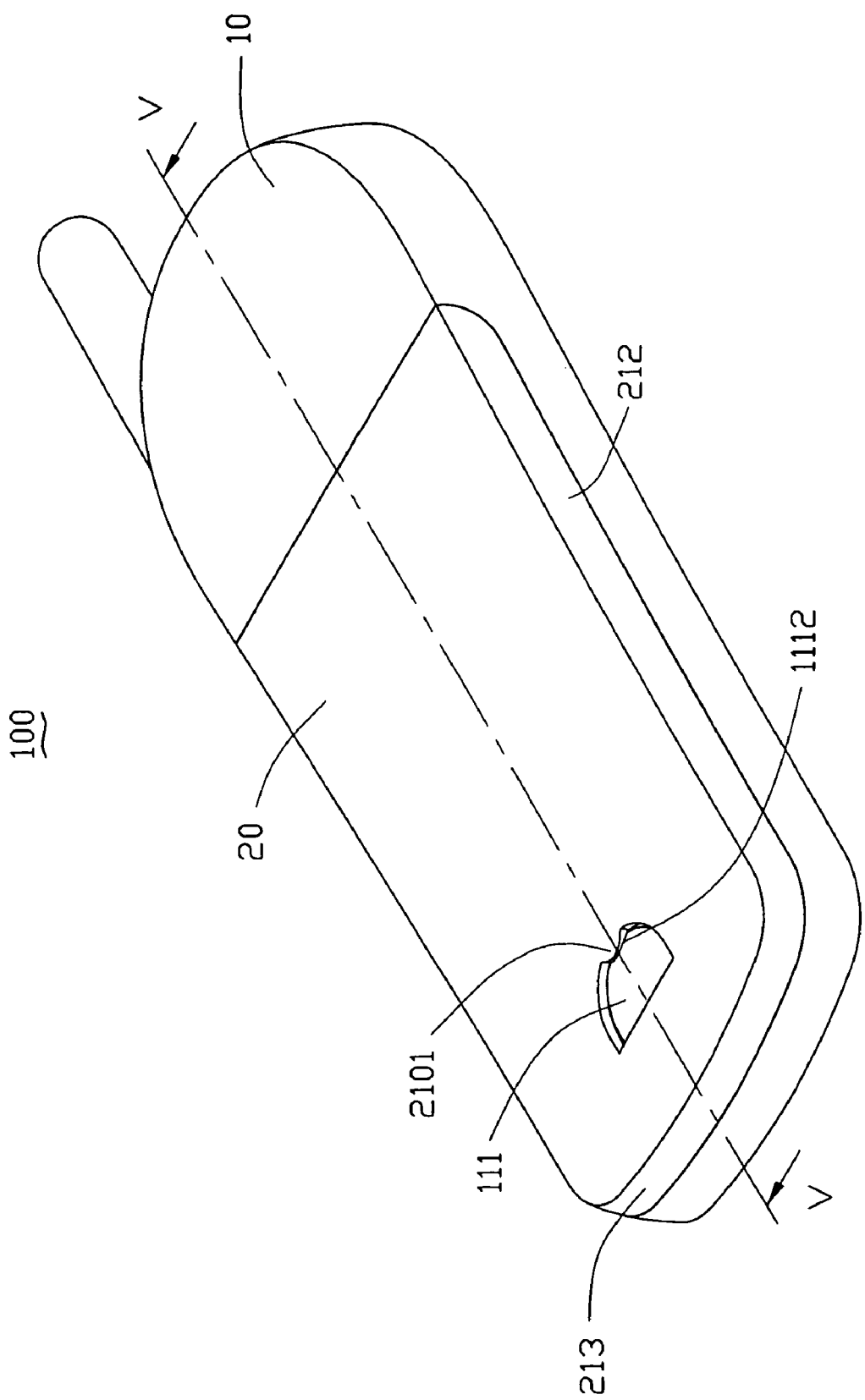
FIG. 4 is an assembled, isometric view of the mobile phone shown in FIG. 1.
Figure 5:
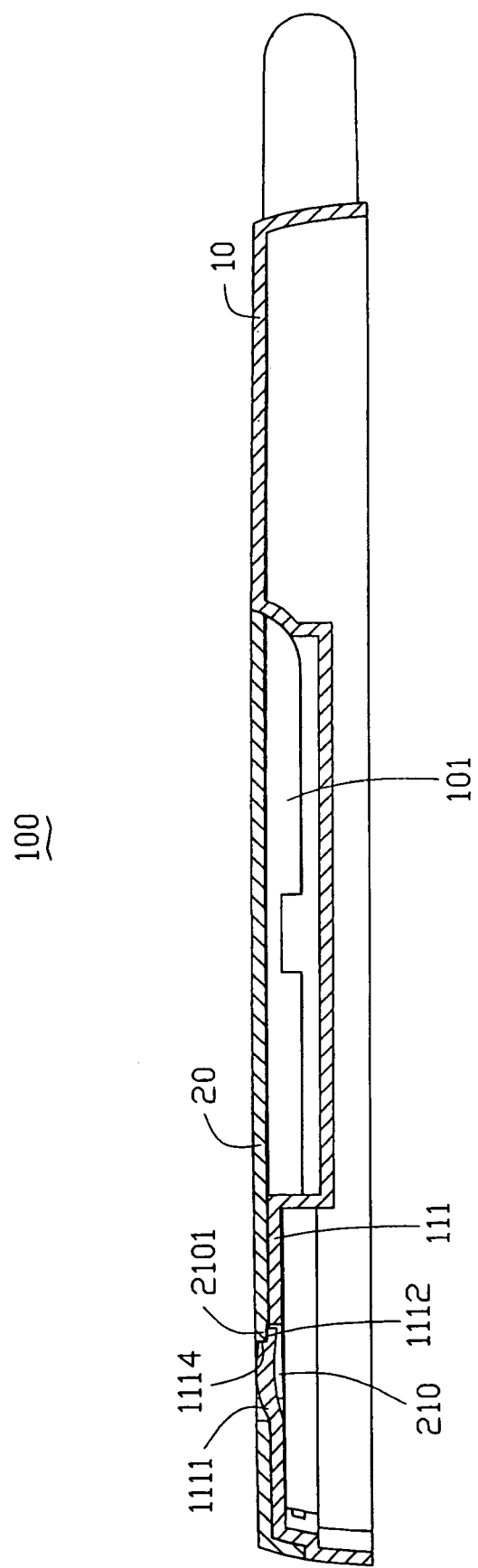
FIG. 5 is a cross-sectional view of FIG. 4, taken along line V-V thereof

In assembly, referring now to FIGS. 4-5, firstly, the battery (not shown) is put in the receiving cavity 12 of the housing 10. Secondly, the two holding blocks 215 of the battery cover 20 are aimed at the holding niches 1045 of the latching portion 104, then, the battery cover 20 is pushed along the direction towards the end wall 101. In the process of pushing the battery cover 20, the elastic portion of the latch plate 1111 produces elastic deformation so as to rotate relative to the fixed portion until the elastic portion is co-planar with the top surface 111. Then, the battery cover 20 is pushed to engage with the housing 10. The two holding blocks 214 of the battery cover 20 engage in the two holding holes 13 of the housing 10. The latching blocks 215 of the battery cover 20 engage in the holding niches 1045 of the latching portion 104. The latch opening 210 engages in the latch plate 1111. The protruding portion 2101 engages in the concave portion 1112 of the latch plate 1111 and resists the step wall 1114. The two catching blocks 2131 engage in the latching holes 1121 of the housing 10. The elastic portion of the latch plate 1111 returns under elastic force to its original position so as to stop the battery cover 20 from being released. Therefore, the battery cover 20 is firmly attached to the housing 10 by the above engagements between the battery cover 20 and the housing 10.

If the battery cover 20 needs to be detached from the housing 10, the latch plate 1111 is pressed by an outside force in a direction toward an inside of the housing 10 to produce elastic deformation so as to be co-planar with the top surface 111, then the battery cover 20 is pulled along the opposite direction towards the end wall 101 so that the two holding blocks 214 of the battery cover 20 are released from the two holding hole 13 of the housing 10, the latching blocks 215 of the battery cover 20 are released from the holding niches 1045 of the latching portion 104, the latch plate 1111 are released from the latch opening 210, the protruding portion 2101 are released from the concave portion 1112 of the latch plate 1111, and the two catching blocks 2131 are released from the latching holes 1121 of the housing 10. Thus, the battery cover 20 is detached from the housing 10 and the elastic portion of the latch plate 1111 automatically rebounds to its original position.

As described above, the preferred embodiment provides the battery cover assembly 100 for the portable electronic device such as a mobile phone. When the latch plate 1111 of the housing 10 is pressed, the battery cover 20 can be detached from the housing 10. This configuration provides the user with convenient operation of the device. Also, when the battery cover 20 is attached to the housing 10, the elastic portion of the latch plate 1111 automatically rebounds to its original position. Thus, the battery cover 20 can be stably attached on the housing 10.

In an alternative embodiment, the latch plate 1111 is replaced by other shape such as rectangle rather than arched. The concave portion 1112 and the protruding portion 2101 can also be of other shape such as annulus rather than arched. The concave portion 1112 can also be omitted, accordingly, and the protruding portion 2101 should also be omitted. The two holding blocks 215 of the battery cover 20 can be omitted, accordingly, the latching portion 104 should also be omitted. The holding blocks 214 can be replaced by holding holes defined therein, accordingly, the holding hole 13 should be replaced by holding blocks extending from thereof.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly for use in a portable electronic device, comprising:
    a housing having an end wall at one end thereof, two side walls with one end connecting to the end wall, a first engaging portion having at least one holding holes formed in the end wall, and a holding portion at an opposite end thereof, the side walls each having a latching portion including three walls connecting to each other so as to define a holding niche facing the holding portion, the holding portion having a latch member;
    a battery cover having a main body, a first sidewall, a second sidewall, and a top wall, the first sidewall and the second sidewall both having an end connecting to the top wall and a latching block formed in the middle thereof for engaging with the holding niches of the latching portion a second engaging portion having at least one holding block formed at one end of the battery cover for engaging with the first engaging portion, and a latch opening defined in one end near the top wall for engaging with the latch member;
    wherein the latch member is integrated with the housing for being elastically deformed by an outside force so as to release the battery cover; and the battery cover is slidable along a plane substantially parallel to a direction towards or away from the end wall of the housing from one end of the housing to the other end of the housing.

2. A battery cover assembly for use in a portable electronic device, comprising:
    a housing having an end wall at one end thereof, a first engaging portion formed in the end wall, and a holding portion at an opposite end thereof, the holding portion having a latch member; the housing having two side walls with one end connecting the end wall, the side walls each have a latching portion including three walls and the three walls are connected to each other so as to define a holding niche facing the holding portion;
    a battery cover having a main body, a first sidewall, a second sidewall, and a top wall, the first sidewall and the second sidewall both have an end connecting to the top wall, a latch opening defined in one end near the top wall for engaging with the latch member; the first sidewall and the second sidewall of the battery cover each have a latching block forming in the middle thereof for engaging with the holding niches of the latching portion; a second engaging portion formed at one end of the battery cover for engaging with the first engaging portion; wherein the latch member is integrated with the housing for being elastically deformed by an outside force so as to release the battery cover.

* * * * *